(12) United States Patent
Calvert

(10) Patent No.: US 8,758,181 B2
(45) Date of Patent: Jun. 24, 2014

(54) CONTINUOUSLY VARIABLE TRANSMISSION WITH NESTED CLUTCH AND PLANETARY OUTPUT

(75) Inventor: Glen Calvert, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 85 days.

(21) Appl. No.: 13/281,677

(22) Filed: Oct. 26, 2011

(65) Prior Publication Data

US 2013/0109522 A1 May 2, 2013

(51) Int. Cl.
*F16H 47/04* (2006.01)

(52) U.S. Cl.
USPC .......................................................... 475/73

(58) Field of Classification Search
USPC ................ 475/5, 72, 73, 78, 80, 83
See application file for complete search history.

(56) References Cited

U.S. PATENT DOCUMENTS

| | | | |
|---|---|---|---|
| 3,969,957 A | 7/1976 | DeLalio | |
| 5,080,637 A * | 1/1992 | Tenberge et al. | 475/81 |
| 5,976,046 A * | 11/1999 | Larkin | 475/72 |
| 6,001,038 A * | 12/1999 | Wontner et al. | 475/81 |
| 6,171,210 B1 | 1/2001 | Miyata et al. | |
| 6,203,463 B1 * | 3/2001 | Casey et al. | 475/72 |
| 6,251,039 B1 | 6/2001 | Koga | |
| 7,021,169 B2 | 4/2006 | Kobayashi | |
| 7,309,067 B2 | 12/2007 | Kita | |
| 7,445,108 B2 | 11/2008 | Bauer et al. | |
| 7,604,561 B2 | 10/2009 | Earhart | |
| 8,303,448 B2 * | 11/2012 | Hiraoka et al. | 475/83 |
| 2005/0211007 A1 | 9/2005 | Suzuki et al. | |
| 2006/0016631 A1 | 1/2006 | Kuang et al. | |
| 2007/0004547 A1 * | 1/2007 | Ripamonti et al. | 475/72 |
| 2007/0117668 A1 * | 5/2007 | Sowul et al. | 475/5 |
| 2010/0069191 A1 | 3/2010 | Swales et al. | |
| 2010/0204000 A1 | 8/2010 | Bailly et al. | |
| 2010/0243395 A1 | 9/2010 | Wiesneth | |
| 2011/0005882 A1 | 1/2011 | Quartier et al. | |

FOREIGN PATENT DOCUMENTS

| | | |
|---|---|---|
| EP | 1128093 | 8/2001 |
| GB | 2 103 317 A | 2/1983 |
| JP | 2009299763 | 12/2009 |

* cited by examiner

*Primary Examiner* — Erin D Bishop
*Assistant Examiner* — Huan Le
(74) *Attorney, Agent, or Firm* — Leydig, Voit & Mayer

(57) ABSTRACT

The described system and method provide a continuously variable full range transmission having inputs for receiving rotational power from a primary power source and a secondary power source such as a hydraulic variator. A first planetary gear group contains first and second planetary gear sets, and the inputs for receiving rotational power are linked to one or more of the first planetary gear set and the second planetary gear set. A second planetary gear group includes a third planetary gear set and a fourth planetary gear set, with a nested clutch assembly having first and second selectable clutches being provided to link the first planetary gear group to the second planetary gear group. Activation of the first clutch fixes the continuously variable transmission in a first speed range, while activation of the second clutch fixes the continuously variable transmission in a second speed range.

20 Claims, 4 Drawing Sheets

| CLUTCH 1 | CLUTCH 2 | FWD BRAKE | REV BRAKE | EXT RANGE CLUTCH | STATE |
|---|---|---|---|---|---|
| ON | OFF | ON | OFF | OFF | FORWARD RANGE 1 |
| ON | OFF | OFF | ON | OFF | REVERSE RANGE 1 |
| OFF | ON | ON | OFF | OFF | FORWARD RANGE 2 |
| OFF | ON | OFF | ON | OFF | REVERSE RANGE 2 |
| OFF | OFF | OFF | OFF | ON | EXTENDED RANGE |
| ON | ON | * | * | OFF | X |
| * | * | ON | ON | OFF | X |
| ON | * | * | * | ON | X |
| * | ON | * | * | ON | X |
| * | * | ON | * | ON | X |
| * | * | * | ON | ON | X |

FIG. 3

CONTINUOUSLY VARIABLE TRANSMISSION WITH NESTED CLUTCH AND PLANETARY OUTPUT

TECHNICAL FIELD

This patent disclosure relates generally to transmission systems for propulsion and, more particularly to a hydraulic parallel path variator transmission system having a compact and efficient layout.

BACKGROUND

Although various types of transmission systems have proven useful in construction machines and other industrial machines for performing tasks and conveying materials, the parallel path variator transmission has been widely adopted for its ability to provide a continuously variable output with a good degree of efficiency. In particular, the parallel path variator (PPV) transmission provides the power and range needed to allow necessary tasks to be performed while minimizing the cost of ownership and operation and ensuring that standards for performance and emissions can be met.

Within the class of PPV transmissions, the common design element is generally a two input system wherein a primary power source, e.g., an internal combustion engine, operates at a generally constant rotational speed to provide one transmission input, while a variable speed source provides the other input. The variable speed source may be an electric motor, hydraulic motor, and so on. The PPV transmission is configured to provide an output rotation speed and torque that is a function of the characteristics of the two inputs.

While PPV transmissions thus provide excellent operational characteristics, they do so at a cost in terms of space and complexity. For example, a typical PPV system is fairly large, incorporating numerous countershafts and peripheral components, which all contribute to the cost, complexity, and footprint of the system.

It will be appreciated that this background description has been created by the inventor to aid the reader, and is not to be taken as a reference to prior art nor as an indication that any of the indicated problems were themselves appreciated in the art.

SUMMARY

In overview, the described system provides a continuously variable full range transmission having a compact and efficient configuration. In an embodiment, a continuously variable transmission is provided having a first input for receiving rotational power from a primary power source and a second input for receiving rotational power from a secondary power source, as well as a first planetary gear group containing a first planetary gear set and a second planetary gear set. Each planetary gear set includes a sun gear, ring gear, and carrier. The first input and the second input are linked to one or more of the first planetary gear set and the second planetary gear set. A second planetary gear group is provided including a third planetary gear set and a fourth planetary gear set.

A nested clutch assembly having first and second selectable clutches links the first planetary gear group to the second planetary gear group, such that activation of the first clutch and not the second clutch fixes the continuously variable transmission in a first speed range. Similarly, activation of the second clutch and not the first clutch fixes the continuously variable transmission in a second speed range.

In another embodiment, a machine power system is provided having a primary power source, a secondary power source, and a parallel path continuously variable transmission configured to receive power from both the primary power source and the secondary power source. The parallel path continuously variable transmission receives power into a first planetary gear group having a first plurality of planetary gear sets and outputs power from a second planetary gear group comprising a second plurality of planetary gear sets. A nested clutch linking the planetary gear groups includes a plurality of clutches configured to place the transmission into an associated plurality of selected speed ranges when actuated.

In yet another embodiment, a method of combining power inputs to provide multi-range output power is provided The method entails linking first and second rotary power inputs into a first planetary gear group. The first planetary gear group includes first and second planetary gear sets having a sun gear, carrier, and ring gear. The first rotary power input is provided by an engine and the second rotary power input is provided by a hydraulic variator. The first planetary gear group is linked to a second planetary gear group via a nested clutch. The second planetary gear group includes third and fourth planetary gear sets having respective sun gears, carriers, and ring gears. The nested clutch includes first and second clutches, such that actuation of the first clutch provides a first speed range output and actuation of the second clutch provides a second speed range output.

Further and alternative aspects and features of the disclosed principles will be appreciated from the following detailed description and the accompanying drawings, of which:

BRIEF DESCRIPTION OF THE DRAWINGS

FIG. 3 is a state chart showing the output state of the parallel path variator transmission system of FIG. 2, based on selected input state configurations in accordance with embodiments of the disclosed principles.

DETAILED DESCRIPTION

This disclosure relates to machines requiring a transmission to link a power source to the final ground-engaging mechanism, e.g., wheels, tracks, etc., and/or to another powered function or implement. Examples of such machines include machines used for mining, construction, farming, transportation, or any other industry known in the art. For example, the machine may be an earth-moving machine, such as a wheel loader, excavator, dump truck, backhoe, motor grader, material handler or the like. Moreover, one or more implements may be connected to the machine for a variety of tasks, including, for example, loading, compacting, lifting, brushing, and may include, for example, buckets, compactors, forked lifting devices, brushes, grapples, cutters, shears, blades, breakers/hammers, augers, and others. In an example embodiment, the system is applied to a continuously variable transmission (CVT), such as may be used in a wheel loader, a track type tractor, or other suitable application environment.

In overview, the described system provides a continuously variable transmission design that utilizes a nested two-range clutch and two coaxial planetary gear groups to provide two speed ranges in both the forward and reverse direction. In an embodiment, a third range in forward is also provided. The nested clutch and planetary design is compact in size and eliminates some of the space consumption and complexity associated with countershaft designs having multiple clutch shafts. The smaller size opens up space to be dedicated to other components such as the variator itself if needed and/or charge pumps.

Figure 1:
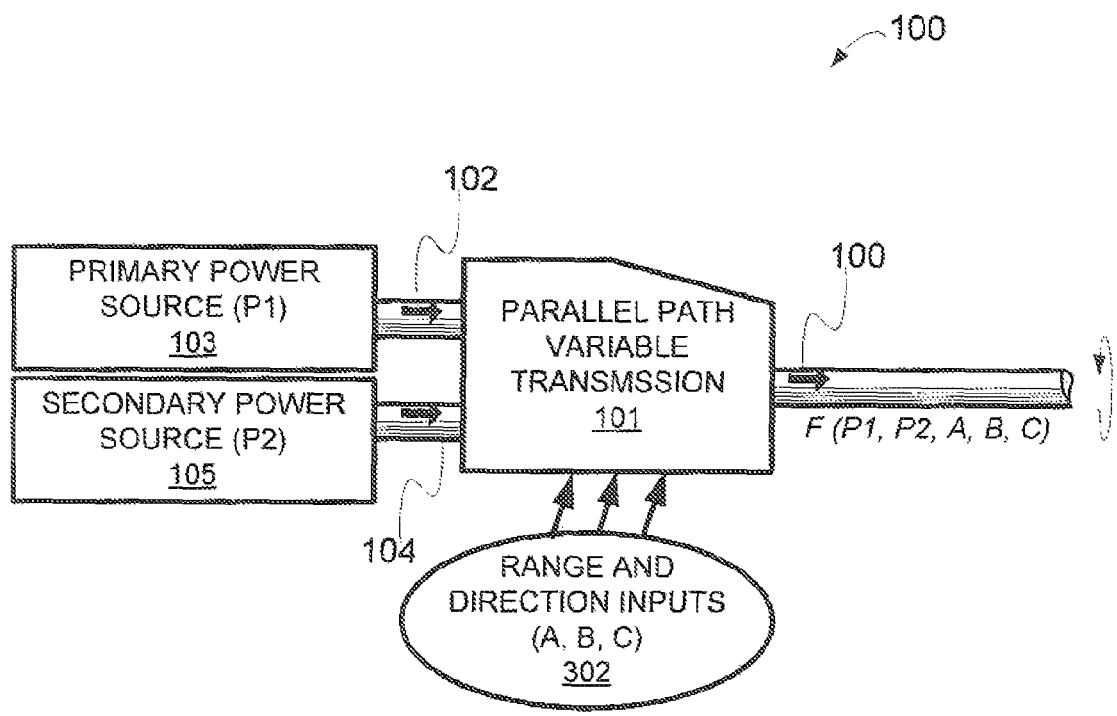
FIG. 1 is a schematic system diagram of a parallel path variator transmission system for providing a variable rotational output based on characteristics of each of two inputs within which embodiments of the disclosed principles may be applied.

As summarized in the brief description of drawings above, FIG. 1 is a schematic system diagram of a parallel path variator transmission system for providing a variable rotational output based on characteristics of each of two inputs. This general overview is provided for the reader's convenience and provides a platform within which embodiments of the disclosed principles may be applied. With respect to the illustrated transmission system 100, a parallel path variable transmission 101 is shown. The parallel path variable transmission 101, which will be described in greater detail later, receives two power inputs as well as one or more data or control inputs, and provides a single power output.

In particular, the parallel path variable transmission 101 receives a first rotational power input 102 from a primary power source 103. The primary power source 103 may be an internal combustion engine, an electric motor, or other source of rotational power. The parallel path variable transmission 101 receives a second rotational power input 104 from a secondary power source 105. As will be discussed in greater detail later herein, the secondary power source 105 may be a hydraulic variator, an electric motor, or other source able to provide a variable speed rotational input.

In most cases, the secondary power source 105 will receive power from the primary power source 103 in order to function. For example, when a hydraulic variator is used as the secondary power source 105, a pump portion of the variator may be powered by the primary power source 103. In addition, other machine features and functions such as electric functions and hydraulic functions may be powered by the primary power source 103, e.g., via a generator or pump as needed. Electric functions may include lighting, electronic processing, electric fans, and so on. Hydraulic functions may include the operation of auxiliary devices and appendages to cut, drill, brush, lift, etc.

Figure 2:
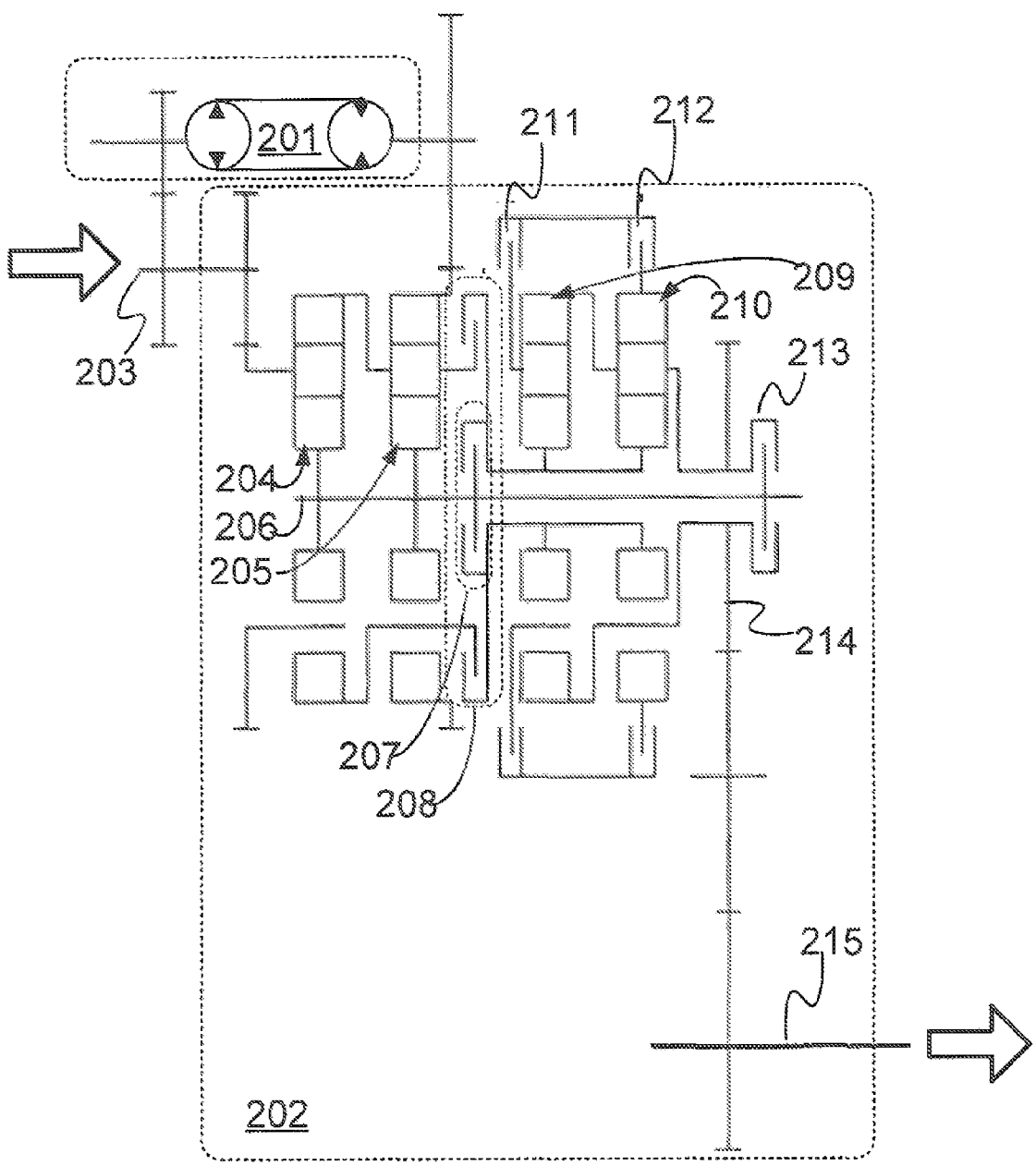
FIG. 2 is a detailed schematic drawing of a parallel path variator transmission system in accordance with embodiments of the disclosed principles.

Although the system illustrated in FIG. 1 is generalized, it provides the context within which specific embodiments of the described system may be implemented. To this end, FIG. 2 is a detailed schematic drawing of a parallel path variator transmission system in accordance with embodiments of the disclosed principles. While incorporating the same overall PPV structure described with respect to FIG. 1, the parallel path variator transmission system includes features within each functional subgroup that provide a significant improvement in function, efficiency, and compactness over prior systems.

In particular, the parallel path variator transmission system includes a variator 201 as well as a planetary transmission 202. The variator 201 receives input power from an engine (not shown) via engine input 203. The engine input 203 further provides rotary power to a carrier of a first planetary gear set 204 within the planetary transmission 202.

The ring gear of the first planetary gear set 204 is linked to the carrier of a second planetary gear set 205 coaxial with the first planetary gear set 204. Moreover, the second planetary gear set 205 receives rotational power from the variator 201 via the ring gear of the second planetary gear set 205. The sun gears of both the first planetary gear set 204 and the second planetary gear set 205 are fixed to a common shaft 206.

The coaxial common shaft 206 and the carrier of the second planetary gear set 205 are clutched via a coaxial nested clutch comprising a first clutch 207 and a second clutch 208 concentrically nested. As will be described later below, the first clutch 207 and a second clutch 208 are operated on a mutually exclusive basis to provide first and second speed ranges respectively.

The output sides of the first clutch 207 and second clutch 208 are fixed together, and are linked to the sun gears of a coaxial third planetary gear set 209 and a coaxial fourth planetary gear set 210 respectively. The ring gear of the third planetary gear set 209 is linked to the carrier of the fourth planetary gear set 210. In addition, the carrier of the third planetary gear set 209 is brakable via a reverse brake 211 while the ring gear of the fourth planetary gear set 210 is brakable via a forward brake 212.

As with the first clutch 207 and second clutch 208, the reverse brake 211 and forward brake 212 are operated on a mutually exclusive basis (not actuated simultaneously), or both brakes may be disengaged and a third range provided by actuating a coaxial extended range clutch 213 in an alternative embodiment. The extended range clutch 213 serves when actuated to tie the shaft 206 to the carrier of the fourth planetary gear set 210 and to an intermediate gear 214. Via other gearing or direct connection, the intermediate gear 214 powers a final output shaft 215.

The operation of the illustrated transmission system of FIG. 2 will be better understood by reference to the state chart 300 of FIG. 3. As can be seen, the transmission system includes five selectable inputs in the illustrated embodiment, including a CLUTCH 1 input 301 (corresponding to the state of the first clutch 207), a CLUTCH 2 input 302 (corresponding to the state of the second clutch 208), a FWD BRAKE input 303 (corresponding to the state of the forward brake 212), a REV BRAKE input 304 (corresponding to the state of the reverse brake 211), and an EXT RANGE CLUTCH input 305 (corresponding to the state of the extended range clutch 213).

Each permitted combination of states 308 of the various inputs 301-305 creates a respective resultant transmission state 306. Certain impermissible combinations 307 are not usable due to the mutually exclusive nature of the brakes and clutches in the illustrated embodiment as discussed above.

Thus, as can be seen, within the permitted combinations of states 308, the CLUTCH 1 input 301 may be on or off. When the CLUTCH 1 input 301 and the FWD BRAKE input 303 are both on and the other inputs are off, the resultant state of the transmission is FORWARD RANGE 1. Similarly, when the CLUTCH 1 input 301 and the REV BRAKE input 304 are both on and the other inputs are off, the resultant state of the transmission is REV RANGE 1.

Likewise, when the CLUTCH 2 input 302 and the FWD BRAKE input 303 are both on and the other inputs are off, the resultant state of the transmission is FORWARD RANGE 2. Similarly, when the CLUTCH 2 input 302 and the REV BRAKE input 304 are both on and the other inputs are off, the resultant state of the transmission is REV RANGE 1.

Finally, as noted above, the extended range clutch 213 provides a third forward range. Thus, when the EXT RANGE CLUTCH input 305 is on and the remaining inputs 301-304 are off, the resultant state of the transmission is EXTENDED RANGE.

Regarding the impermissible combinations 307, these states include any combination of inputs wherein both the forward brake 212 and reverse brake 211 are simultaneously actuated, as well as any combination of inputs wherein the first clutch 207 and the second clutch 208 are simultaneously actuated. Finally, any combination of inputs wherein the extended range clutch 213 is actuated while any other input is active also falls with the set impermissible combinations 307 given the illustrated configuration. It will be appreciated that configurations that are not exactly as illustrated but that still fall within the described principles may nonetheless have different permissible and impermissible combinations depending upon their precise arrangement.

Figure 4:
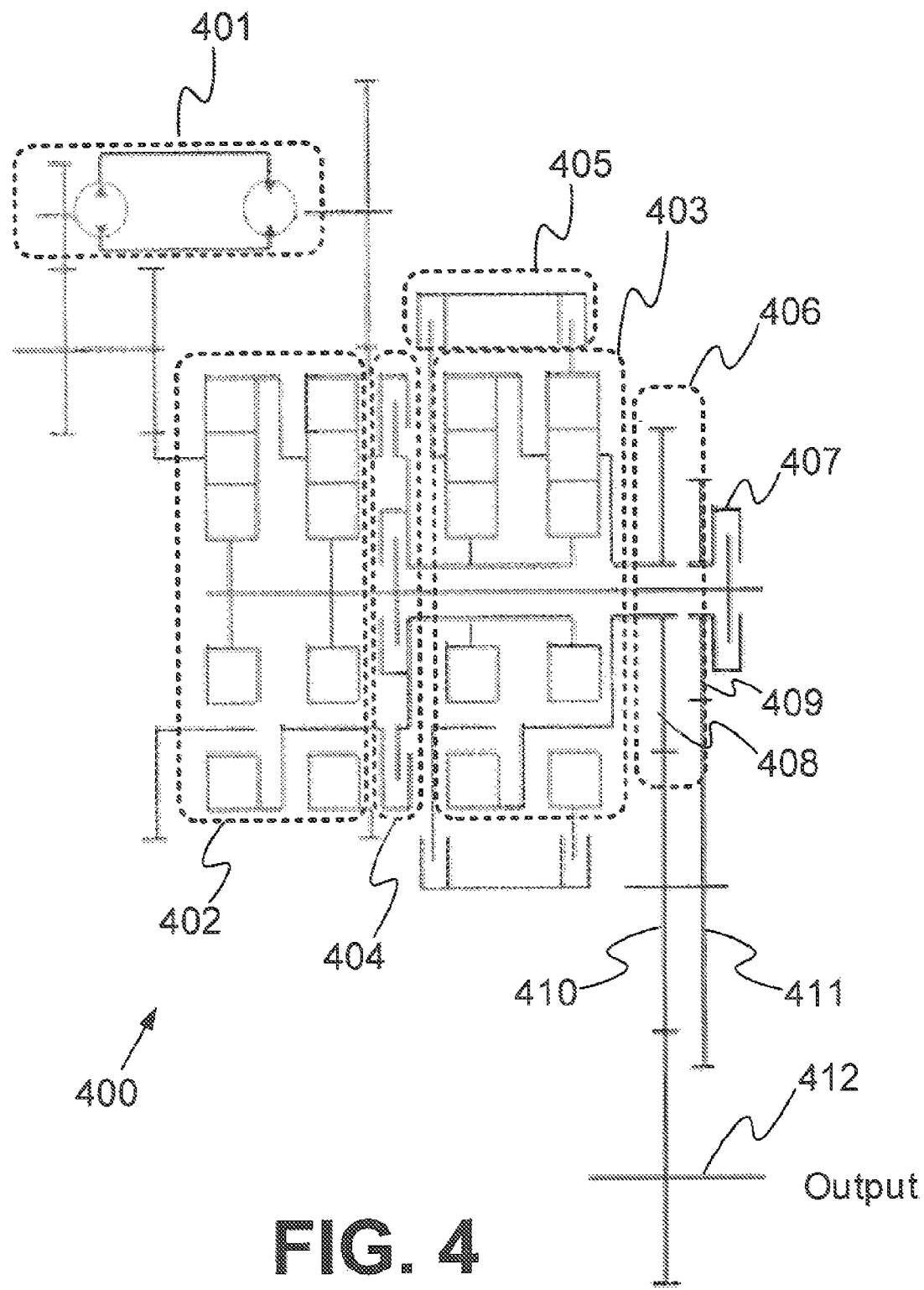
FIG. 4 is a detailed schematic drawing of an alternative parallel path variator transmission system in accordance with embodiments of the disclosed principles.

FIG. 4 is a detailed schematic drawing of an alternative parallel path variator transmission system in accordance with another embodiment of the disclosed principles. The elements of the alternative embodiment that are common with the previously described embodiment have been reduced slightly in visual prominence for clarity of description.

The illustrated alternative parallel path variator transmission system 400 includes many of the same elements as the previously described embodiment, including a variator 401, a first planetary group 402 having two coaxial planetary gear sets, a second planetary group 403 having two coaxial planetary gear sets, and a nested clutch 404, coaxial with the planetary groups, for selectively coupling the first planetary group 402 and the second planetary group 403. Similarly, a two-brake system 405 is included for selectively braking elements of the second planetary group 403 to provide forward and reverse configurations.

In keeping with the illustrated alternative configuration, two output gear ratios are provided by an output gear set 406 a coaxial with and operating in conjunction with the third clutch 407. The output gear set 406 includes a first output gear 408 and a second output gear 409. The first output gear 408 mates to first counter gear 410 while the second output gear 409 mates to a second counter gear 411. The first counter gear 410 and second counter gear 411 are mounted on and fixed to a common shaft, and the first counter gear 410 drives the final gearing of the transmission to provide a final output 412.

In operation, the common section of the transmission functions as described above with respect to the first embodiment. However, the output characteristics of the transmission when in the extended range configuration (i.e., when the third clutch 407 is actuated) are modified by the multiple ratios of the output gear set 406. In particular, the ratios of the first output gear 408 to the first counter gear 410 will affect the final drive ratio in the first and second ranges in forward and reverse. In contrast, the ratio of the second output gear 409 to the second counter gear will independently establish the final drive ratio when the transmission is in the extended range configuration.

In this way, a compact and efficient planetary drive system is provided for a parallel path variator transmission application according to the first described embodiment. With the alternative embodiment, further adjustment is provided to tune the difference between the first two ranges and the extended range setting.

Industrial Applicability

The described principles are applicable to machines requiring a transmission to link a power source to the final ground-engaging mechanism, e.g., wheels, tracks, etc., and/or to another powered function or implement. Examples of such machines include machines used for mining, construction, farming, transportation, or any other industry known in the art. For example, the machine may be an earth-moving machine, such as a wheel loader, excavator, dump truck, backhoe, motor grader, material handler or the like. Exemplary implements include, without limitation, buckets, compactors, forked lifting devices, brushes, grapples, cutters, shears, blades, breakers/hammers, augers, and others.

Within such applications, the described principles apply to the operation of hydraulic and other types of parallel path variable transmissions that provide a rotational output having characteristics set by a number of input power streams as well as a number of transmission state variables. For example, the output of a hydraulic parallel path variator according to the described principles is a combination of rotational inputs, including those from an engine and a hydraulic variator, in a manner established by the state of the transmission as selected by clutch and brake actuation.

In particular, the state of the transmission may be set via the setting and releasing of various clutches and brakes, so as to configure the range and direction of the transmission output. The described coaxial transmission system beneficially eliminates the traditional requirement for multiple countershafts to support multiple speed ranges. In particular, even without the use of countershafts to change transmission ranges, the illustrated configurations provide a full set of three forward ranges and two reverse ranges.

It will be appreciated that the foregoing description provides useful examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for the features of interest, but not to exclude such from the scope of the disclosure entirely unless otherwise specifically indicated.

I claim:

1. A continuously variable transmission comprising:
a first input for receiving rotational power from a primary power source;
a second input for receiving rotational power from a secondary power source;
a first planetary gear group containing a first planetary gear set and a second planetary gear set, each having a sun gear, ring gear, and carrier, wherein the first input and the second input are linked to one or more of the first planetary gear set and the second planetary gear set such that the first input is directly connected with and drives the carrier of the first planetary gear set and the second input is directly connected with and drives the ring gear of the second planetary gear set;
a second planetary gear group containing a third planetary gear set and a fourth planetary gear set, each having a sun gear, ring gear, and carrier; and
a nested clutch assembly linking the first planetary gear group to the second planetary gear group, the nested clutch assembly having first and second selectable clutches, the first clutch having a first-clutch inner disk that is directly connected with and driven by the sun gears of the first and second planetary gear sets and an outer disk that is directly connected with and driving the sun gears of the third and fourth planetary gear sets, the second clutch having a second-clutch inner disk that is directly connected with and driving the sun gears of the third and fourth planetary gear sets and an outer disk that is directly connected with and driven by the carrier of the second planetary gear set, wherein the first-clutch outer disk is integrated with the second-clutch inner disk, and wherein activation of the first clutch and not the second clutch fixes the continuously variable transmission in a first speed range, and activation of the second clutch and not the first clutch fixes the continuously variable transmission in a second speed range.

2. The continuously variable transmission according to claim 1, wherein the primary power source comprises an internal combustion engine.

3. The continuously variable transmission according to claim 1, wherein the secondary power source comprises a hydraulic variator.

4. The continuously variable transmission according to claim 1, wherein the first selectable clutch links the sun gears of each of the first and second planetary gear sets to the sun gears of each of the third and fourth planetary gear sets, and wherein the second selectable clutch links the carrier of the second planetary gear set to the sun gears of each of the third and fourth planetary gear sets.

5. The continuously variable transmission according to claim 1, further comprising a first brake and a second brake associated with the second planetary gear group, wherein actuation of the first brake and not the second brake places the continuously variable transmission into a forward mode and actuation of the second brake and not the first brake places the continuously variable transmission into a reverse mode.

6. The continuously variable transmission according to claim 5, further comprising a third selectable clutch, wherein actuation of the third selectable clutch places the continuously variable transmission into a third speed range.

7. The continuously variable transmission according to claim 6, wherein the transmission includes an intermediate gear providing power to a final output gear, wherein the intermediate gear is driven by the carrier of the fourth planetary gear set in the first and second speed ranges and by the sun gears of the first and second planetary gear sets in the third speed range.

8. The continuously variable transmission according to claim 6, wherein the transmission includes a final output gear set including a first output gear and a second output gear, the first and second output gears being mated to first and second counter gears on a common output shaft, the first output gear driving the first counter gear and the common output shaft in the first and second speed ranges, and the second output gear driving the second counter gear and the common output shaft in the third speed range.

9. A machine power system comprising:
a primary power source;
a secondary power source;
a parallel path continuously variable transmission configured to receive power from both the primary power source and the secondary power source, the parallel path continuously variable transmission receiving power into a first planetary gear group comprising a first plurality of planetary gear sets and outputting power from a second planetary gear group comprising a second plurality of planetary gear sets; and
a nested clutch linking the first planetary gear group to the second planetary gear group, the nested clutch including at least a first clutch and a second clutch, the first clutch having a first-clutch inner disk that is directly connected with and driven by a sun gear of a first planetary gear group and an outer disk that is directly connected with and drives a sun gear of the second planetary gear groups, the second clutch having a second-clutch inner disk that is directly connected with an drives the sun gear of the second planetary gear group and an outer disk that is directly connected with and driven by a carrier of the first planetary gear group, wherein the first-clutch outer disk is integrated with the second-clutch inner disk, each clutch being configured to place the transmission in a selected speed range when actuated.

10. The machine power system according to claim 9, wherein the primary power source comprises an internal combustion engine.

11. The machine power system according to claim 9, wherein the secondary power source comprises a hydraulic variator.

12. The machine power system according to claim 9, wherein the first plurality of planetary gear sets includes first and second planetary gear sets and the second plurality of planetary gear sets includes third and fourth planetary gear sets, each planetary gear set having a sun gear, carrier, and ring gear, wherein the first selectable clutch links the sun gears of each of the first and second planetary gear sets to the sun gears of each of the third and fourth planetary gear sets, and wherein the second selectable clutch links the carrier of the second planetary gear set to the sun gears of each of the third and fourth planetary gear sets.

13. The machine power system according to claim 9, wherein the parallel path continuously variable transmission further comprises a first brake and a second brake associated with the second planetary gear group, such that actuation of the first brake and not the second brake places the transmission into a forward mode and actuation of the second brake and not the first brake places the transmission into a reverse mode.

14. The machine power system according to claim 13, wherein the parallel path continuously variable transmission further comprises a third selectable clutch, wherein actuation of the third selectable clutch places the continuously transmission into a third speed range.

15. The machine power system according to claim 14, wherein the first plurality of planetary gear sets includes first and second planetary gear sets and the second plurality of planetary gear sets includes third and fourth planetary gear sets, each planetary gear set having a sun gear, carrier, and ring gear, and wherein the transmission includes an intermediate gear providing power to a final output gear, wherein the intermediate gear is driven by the carrier of the fourth planetary gear set in the first and second speed ranges and by the sun gears of the first and second planetary gear sets in the third speed range.

16. The machine power system according to claim 14, wherein the transmission includes a final output gear set including a first output gear and a second output gear, the first and second output gears being mated to first and second counter gears on a common output shaft, the first output gear driving the first counter gear and the common output shaft in the first and second speed ranges, and the second output gear driving the second counter gear and the common output shaft in the third speed range.

17. A method of combining power inputs to provide multi-range output power comprising:
linking first and second rotary power inputs into a first planetary gear group, the first rotary power input being from an engine and the second rotary power input being from a hydraulic variator, the first planetary gear group including first and second planetary gear sets, each having a sun gear, carrier, and ring gear,
wherein linking the first rotary power input into the first planetary gear group includes directly connecting the first power input with a carrier of the first planetary gear set, and wherein linking the second rotary power input into the first planetary gear group includes directly connecting the second power input to the ring gear of the second planetary gear set; and via a nested clutch, the nested clutch including a first clutch and a second clutch, the first clutch having first-clutch inner and outer disks, the second clutch having second-clutch inner and outer disks, wherein the first-clutch outer disk is integrated with the second-clutch inner disk, linking the first planetary gear group to a second planetary gear group, the second planetary gear group including third and fourth planetary gear sets, each having a sun gear, carrier, and ring gear, wherein actuation of the first clutch provides a first speed range output by directly connecting the sun gears of the first and second planetary gear sets to the sun gears of the third and fourth planetary gear sets and actuation of the second clutch provides a second speed range output by directly connecting the carrier gear of the second planetary gear set with the sun gears of the third and fourth planetary gear sets.

18. The method of combining power inputs to provide multi-range output power in accordance with claim 17, further comprising providing a first brake and a second brake associated with the second planetary gear group, such that actuation of the first brake and not the second brake places the transmission into a forward mode and actuation of the second brake and not the first brake places the transmission into a reverse mode.

19. The method of combining power inputs to provide multi-range output power in accordance with claim 17, further comprising linking a third clutch to the first planetary gear group such that actuation of the third clutch provides a third speed range output.

20. The method of combining power inputs to provide multi-range output power in accordance with claim 17, wherein the first speed range output and second speed range output are provided by the carrier of the fourth planetary gear set.

\* \* \* \* \*

UNITED STATES PATENT AND TRADEMARK OFFICE
CERTIFICATE OF CORRECTION

| | |
|---|---|
| PATENT NO. | : 8,758,181 B2 |
| APPLICATION NO. | : 13/281677 |
| DATED | : June 24, 2014 |
| INVENTOR(S) | : Glen Calvert |

It is certified that error appears in the above-identified patent and that said Letters Patent is hereby corrected as shown below:

In the Specification

Column 5, line 59, delete "Industrial Applicability" and insert -- INDUSTRIAL APPLICABILITY --.

In the Claims

Column 7, line 64, in Claim 9, delete "groups," and insert -- group, --.

Column 7, line 65, in Claim 9, delete "an" and insert -- and --.

Signed and Sealed this
Fifteenth Day of September, 2015

Michelle K. Lee
*Director of the United States Patent and Trademark Office*